3,776,944
TETRALONEOXY ACETIC ACIDS AND ESTERS THEREOF

Richard E. Brown, Hanover, N.J., Paul Cavanagh, Oshawa, Ontario, Canada, and John Shavel, Jr., Mendham, N.J., assignors to Warner-Lambert Company, Morris Plains, N.J.
No Drawing. Filed Sept. 16, 1971, Ser. No. 181,199
Int. Cl. C07c 69/76
U.S. Cl. 260—473 F  12 Claims

ABSTRACT OF THE DISCLOSURE

Tetraloneoxy acetic acids having the following structural formulas are described:

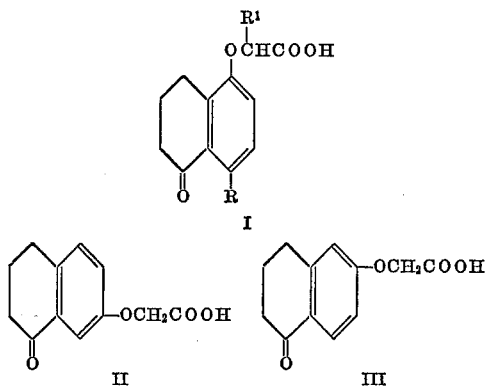

wherein R is hydrogen or lower alkoxy and $R^1$ is hydrogen, lower alkyl or aryl. These compounds are prepared by the following reaction scheme:

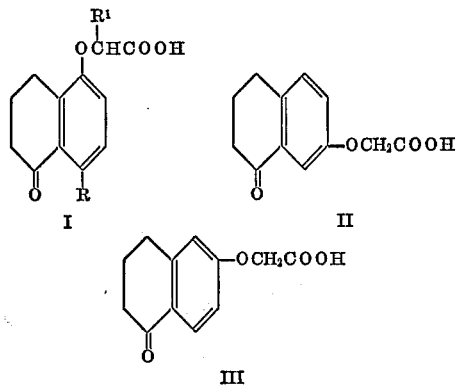

They are useful as anti-flammatory agents.

---

The present invention relates to novel chemical compounds and, more particularly, the present invention relates to tetraloneoxy acetic acids having the following structural formulas:

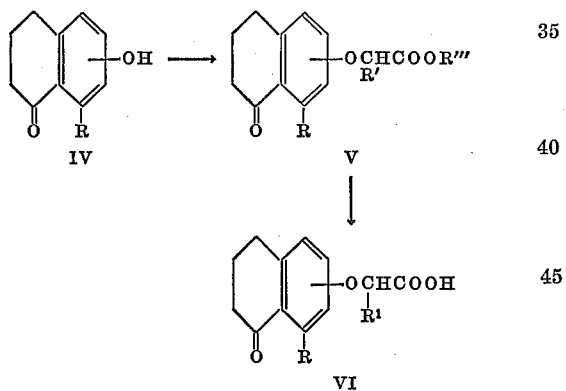

wherein R is hydrogen or lower alkoxy and $R^1$ is hydrogen, lower alkyl or aryl.

In the above definitions for R and $R^1$, the term "lower alkyl" and the "alkyl" portion of alkoxy is meant to include straight or branched carbon chain containing from 1 to 7 carbon atoms. These include, for example, methyl, ethyl, propyl, isopropyl and the like. The term "aryl" is meant to be a monocyclic aromatic hydrocarbon, preferably of 6 to 10 carbon atoms, such as, for example, phenyl, tolyl and the like.

The compounds of this invention are useful as antiflammatory agents in several mammalian species, such as, for example, cats, dogs, monkeys and the like. For example, in a laboratory experiment employing well-known carrageenin induced rat paw edema tests, the above compounds were observed to reduce the resulting inflammation up to 19% at an oral or parenteral dose of about 100 mg./kg.

These compounds are indicated in inflammatory conditions such as those caused by arthritis. Generally speaking, a dose of from about 100 mg. to 500 mg. in several divided doses daily, orally or by injection, is prescribed to relieve such inflammation. This dose regimen can be varied according to the condition of the patient being treated by methods well known to the healing arts.

In order to use these compounds, they are combined with known pharmaceutical diluents such as lactose, mannitol, dicalcium phosphate and the like and compounded into dosage forms such as tablets, powders and the like. They can also be combined with diluents such as water for injection, peanut oil and compounded into dsage forms suitable for injection.

The compounds of the invention are prepared in accordance with the following reaction scheme:

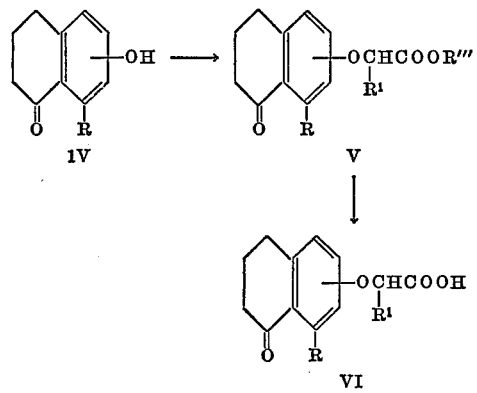

Referring to the scheme, in the first step a tetralone of structure IV in which the hydroxyl group may be in the 5, 6 or 7 position is reacted with a suitable β-haloester with a base in a suitable solvent. Exemplary of the haloesters which may be used are ethyl-α-bromoacetate, methyl-α-chlorophenyl acetate and the like. Among the bases which can be used are alkali metal alkoxides such as sodium methoxide or potassium-t-butoxide or preferably, an alkali metal carbonate such as potassium carbonate. Solvents of use are lower alcohols such as methanol or ethanol, or preferably, a lower ketone such as acetone or methyl ethyl ketone. The ester V obtained according to step I is then hydrolyzed in step II to give the final product, VII. Such a hydrolysis may be carried out in either acidic or basic medium; however, in the present case, acid hydrolysis is preferable. Among the acids which may be used are mineral acids such as hydrochloric, sulfuric or hydrobromic.

In order to further illustrate the practice of this invention, the following examples are included. Room temperature referred to therein is meant to be from about 20° C. to 30° C.

EXAMPLE 1

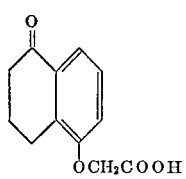

[(5,6,7,8-tetrahydro-5-oxo-1-naphthyl)oxyacetic acid

Was prepared in an analogous manner to compound of Example 3 in 67% yield, M.P. 156–58° (EtOH).

*Analysis.*—Calcd. for $C_{12}H_{12}O_4$: C, 65.44; H, 5.49; Found: C, 65.49; H, 5.46.

EXAMPLE 2

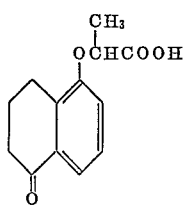

2-[(5,6,7,8-tetrahydro-5-oxo-1-naphthyl)oxy]propionic acid

Was prepared in an analogous manner to compound of Example 3 except that aqueous-ethanolic HCl (80 ml. 10% HCl and 50 ml. ethanol) was used as the reaction medium. M.P. 136–138° ($CH_3CN$), 50% yield.

*Analysis.*—Calcd. for $C_{13}H_{14}O_4$: C, 66.65; H, 6.02; O, 27.32. Found: C, 66.91; H, 6.11; O, 27.16.

EXAMPLE 3

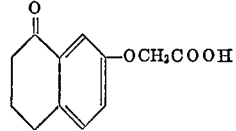

[(5,6,7,8-tetrahydro-8-oxo-2-naphthyl]oxy)acetic acid

A suspension of 4.60 g. (0.0185 mole of ethyl[(5,6,7,8-tetrahydro-8-oxo-2 - naphthyl)oxy]acetate compound of Example 9 in 100 ml. of 4 N HCl was refluxed with stirring for 3 hours. After cooling to room temperature, the precipitate was collected. Recrystallization from chloroform gave 3.6 g., M.P. 141–43.5°, 87%.

*Analysis.*—Calcd. for $C_{12}H_{12}O_4$: C, 65.44; H, 5.49; Found: C, 65.37; H, 5.29.

EXAMPLE 4

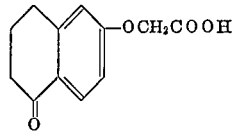

[(5,6,7,8-tetrahydro-5-oxo-2-naphthyl)oxo]acetic acid

Was prepared in a manner analogous to the preparation of compound of Example 2 in 70% yield, M.P. 191–94° (95% ethanol).

*Analysis.*—Calcd. for $C_{12}H_{12}O_4$: C, 65.44; H, 5.49. Found: C, 65.08; H, 5.54.

EXAMPLE 5

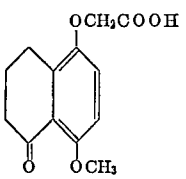

[(5,6,7,8-tetrahydro-4-methoxy-5-oxo-1-naphthyl)oxy] acetic acid

Was prepared in an analogous manner to compound of Example 8 in 50% yield, M.P. 218–21° (LtOH).

*Analysis.*—Calcd. for $C_{13}H_{14}O_5$: C, 62.39; H, 5.64. Found: C, 62.16; H, 5.66.

EXAMPLE 6

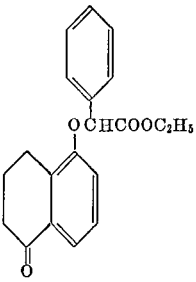

Ethyl phenyl[(5,6,7,8-tetrahydro-5-oxo-1-naphthyl)oxy] acetate

A mixture of 19.8 gm. 5-hydroxytetralone, 13.0 gm. anhydrous sodium carbonate and 24.7 gm. ethyl bromophenyl acetate in 200 ml. acetone was refluxed under an atmosphere of nitrogen for 3 days. After filtering and stripping the filtrate, the residue was taken up in 200 ml. methylene chloride and extracted well with 1 N NaOH. The residue left after drying ($Na_2SO_4$) and stripping the methylene chloride was extracted by refluxing with 1000 ml. hexane for 30 minutes, and the hexane was decanted from the insoluble tar. On cooling slowly, the hexane deposited a small amount of brown oil and then began depositing crystals. At this instant, the hexane was decanted and allowed to crystallize fully. Two recrystallizations from hexane gave 18.9 gm., M.P. 88.5–89.5°.

*Analysis.*—Calcd. for $C_{20}H_{30}O_4$: C, 74.06; H, 6.21. Found: C, 74.42, 74.34; H, 6.30, 6.23.

EXAMPLE 7

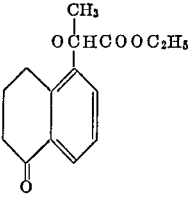

Ethyl 2[(5,6,7,8-tetrahydro-5-oxo-1-napthyl) oxy]propionate

Was prepared in an analogous way to compound of Example 9 with the exceptions of a longer reflux period (a total of 4 days), and the product was chromatographed on a column of silica gel (benzene eluant). B.P. 155–60°/0.25 mm. The yield was 66%.

*Analysis.*—Calcd. for $C_{15}H_{18}O_4$: C, 68.69; H, 6.92 O, 24.40. Found: C, 68.39; H, 6.92; O, 24.27.

EXAMPLE 8

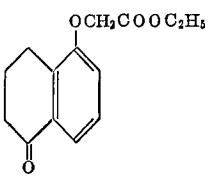

Ethyl[(5,6,7,8-tetrahydro-5-oxo-1-naphthyl) oxy]acetate

Was prepared in an analogous way to compound of Example 9 in 80% yield, M.P. 60–62° (hexane).

*Analysis.*—Calcd. for $C_{14}H_{16}O_4$: C, 67.73; H, 6.50. Found: C, 67.83; H, 6.44.

EXAMPLE 9

Ethyl[(5,6,7,8-tetrahydro-8-oxo-2-naphthyl)oxy]acetate

A solution of 20.0 g. (0.123 mole) 5,6,7,8-tetrahydro-8-oxo-2-naphthol, 9.3 g. (0.0672 mole) anhydrous potassium carbonate, and 25.0 g. (0.15 mole) of ethyl-bromoacetate in 1000 ml. of dry acetone was refluxed for 48 hours under an atmosphere of nitrogen. After cooling to room temperature, the solution was filtered and then concentrated to dryness. The solid residue was recrystallized by hexane (1.5 liter) to give 26.6 g., M.P. 80.5–84°, 85%. A sample was recrystallized twice more for analysis, M.P. 81–83°.

Analysis.—Calcd. for $C_{14}H_{16}O_4$: C, 67.73; H, 6.50; Found: C, 67.97; H, 6.50.

EXAMPLE 10

Ethyl[(5,6,7,8-tetrahydro-4-methoxy-5-oxo-1-napthyl)oxy]acetate

Was prepared in an analogous manner to compound of Example 9 in 31% yield, M.P. 85–86.5° (hexane).

Analysis.—Calcd. for $C_{15}H_{18}O_5$: C, 64.73; H, 6.52. Found: C, 64.67; H, 6.48.

EXAMPLE 11

Ethyl [(5,6,7,8-tetrahydro-5-oxo-2-naphthyl)oxy]acetate

Was prepared in a mannar analogous to the preparation of compound of Example 9 except that the product was isolated by distillation instead of by crystallization from hexane. The distillate solidified on standing at room temperature. B.P. 159–169°/0.05 mm.; 46.5–47.5°.

Analysis.—Calcd. for $C_{14}H_{16}O_4$: C, 67.73; H, 6.50: Found: C, 67.80; H, 6.39 cm.$^{-1}$.

We claim:

1. A member selected from the group consisting of compounds of the formula:

wherein R is a member selected from the group consisting of hydrogen and lower alkoxy and $R^1$ is a member selected from the group consisting of hydrogen, lower alkyl and phenyl.

2. A compound according to claim 1 which is [(5,6,7,8-tetrahydro-5-oxo-1-naphthyl)oxy]acetic acid.

3. A compound according to claim 1 which is 2-[5,6,7,8-tetrahydro-5-oxo-1-naphthyl)oxy]propionic acid.

4. A compound according to claim 1 which is [(5,6,7,8-tetrahydro-8-oxo-2-naphthyl)oxo]acetic acid.

5. A compound according to claim 1 which is [(5,6,7,8-tetrahydro-5-oxo-2-naphthyl)oxo]acetic acid.

6. A compound according to claim 1 which is [(5,6,7,8-tetrahydro-4-methoxy - 5 - oxo-1-naphthyl)oxy]acetic acid.

7. Ethyl phenyl[(5,6,7,8-tetrahydro-5-oxo-1-naphthyl)oxy]acetate.

8. Ethyl 2-[(5,6,7,8-tetrahydro-5-oxo-1-naphthyl)oxy]propionate.

9. Ethyl [5,6,7,8-tetrahydro - 5 - oxo-1-naphthyl)oxy] acetate.

10. Ethyl[(5,6,7,8-tetrahydro - 8 - oxo-2-naphthyl)oxo] acetate.

11. Ethyl[5,6,7,8-tetrahydro - 5 - oxo-2-naphthyl)oxy] acetate.

12. Ethyl[(5,6,7,8-tetrahydro-5-oxo - 2 - naphthyl)oxy] acetate.

References Cited

UNITED STATES PATENTS

| | | | |
|---|---|---|---|
| 3,247,253 | 4/1966 | Benze | 260—473 F |
| 3,565,904 | 2/1971 | Juby | 260—473 F |

LORRAINE A. WEINBERGER, Primary Examiner

J. F. TERAPANE, Assistant Examiner

U.S. Cl. X.R.

260—520; 424—308, 317